July 23, 1935.  J. GOGAN  2,009,314
HARDNESS TESTING APPARATUS
Filed April 20, 1932  8 Sheets-Sheet 4
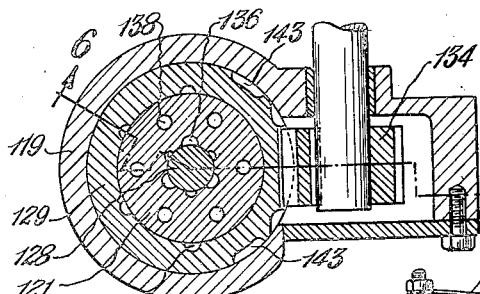
FIG. 7
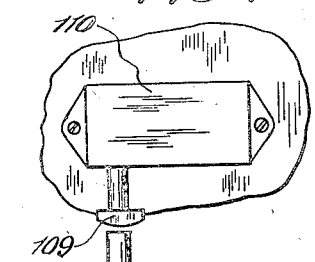
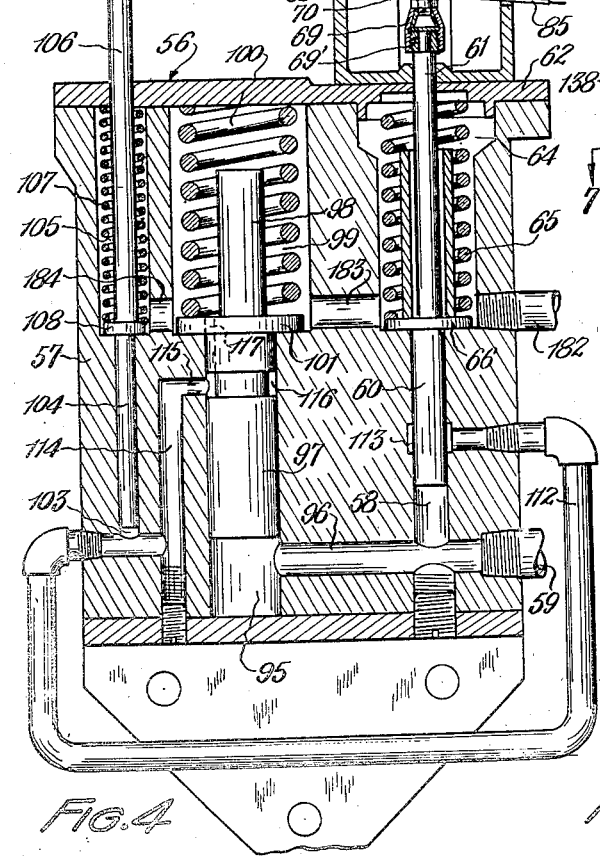
FIG. 4
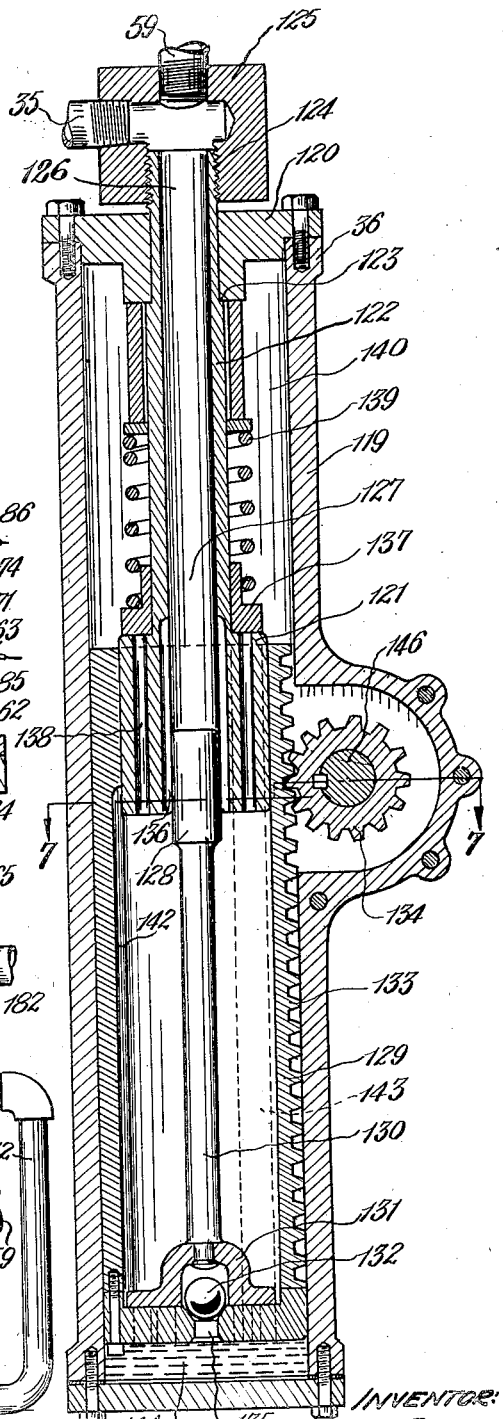
FIG. 6
INVENTOR:
JOSEPH GOGAN
ATTORNEYS July 23, 1935.   J. GOGAN   2,009,314

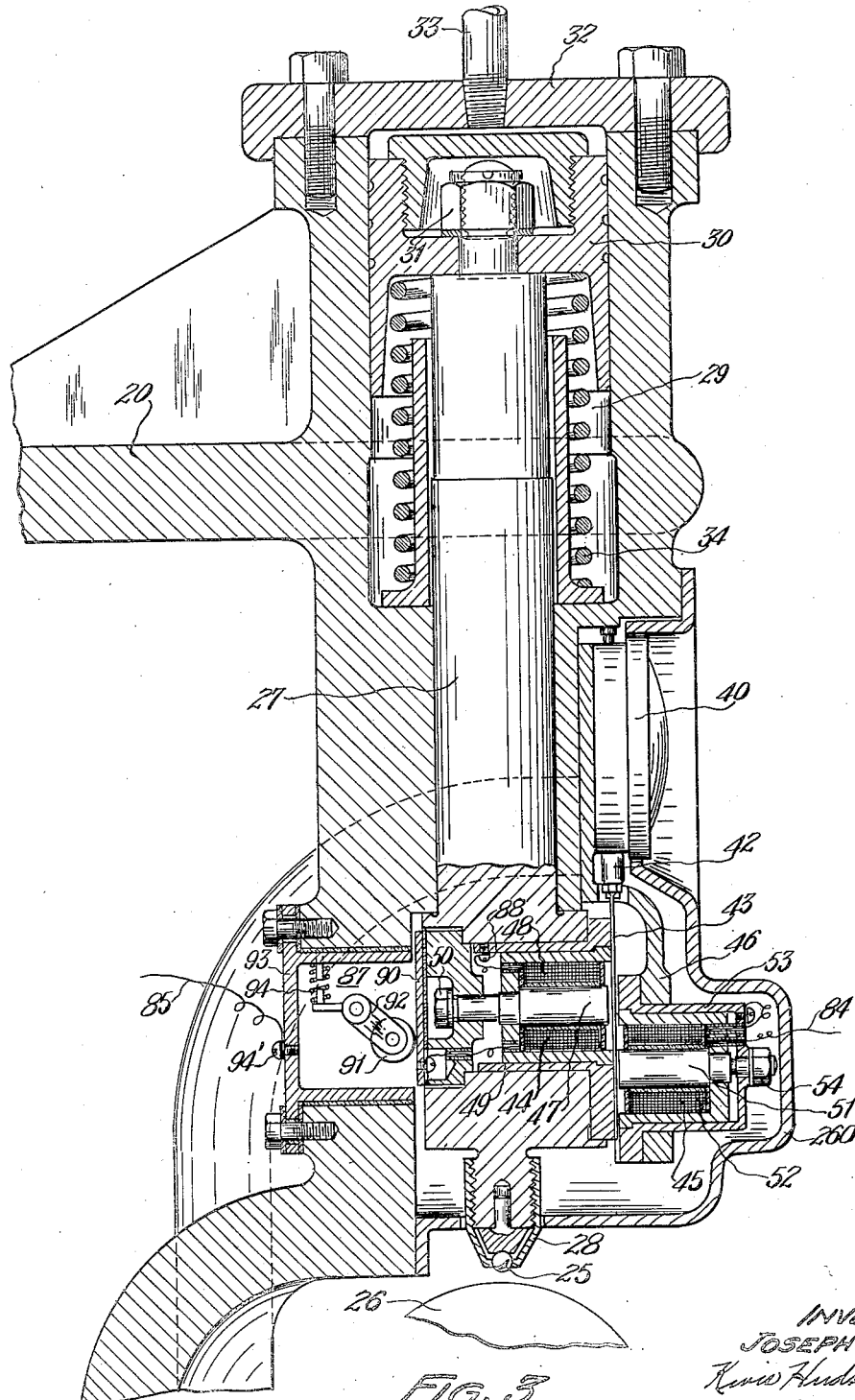

HARDNESS TESTING APPARATUS

Filed April 20, 1932   8 Sheets-Sheet 5

INVENTOR
JOSEPH GOGAN
ATTORNEYS

July 23, 1935.  J. GOGAN  2,009,314

HARDNESS TESTING APPARATUS

Filed April 20, 1932    8 Sheets-Sheet 6

INVENTOR:
JOSEPH GOGAN
Kwis Hudson & Kent
ATTORNEYS

July 23, 1935.  J. GOGAN  2,009,314
HARDNESS TESTING APPARATUS
Filed April 20, 1932   8 Sheets-Sheet 7

INVENTOR
JOSEPH GOGAN
*Kwis Hudson & Kent*
ATTORNEYS

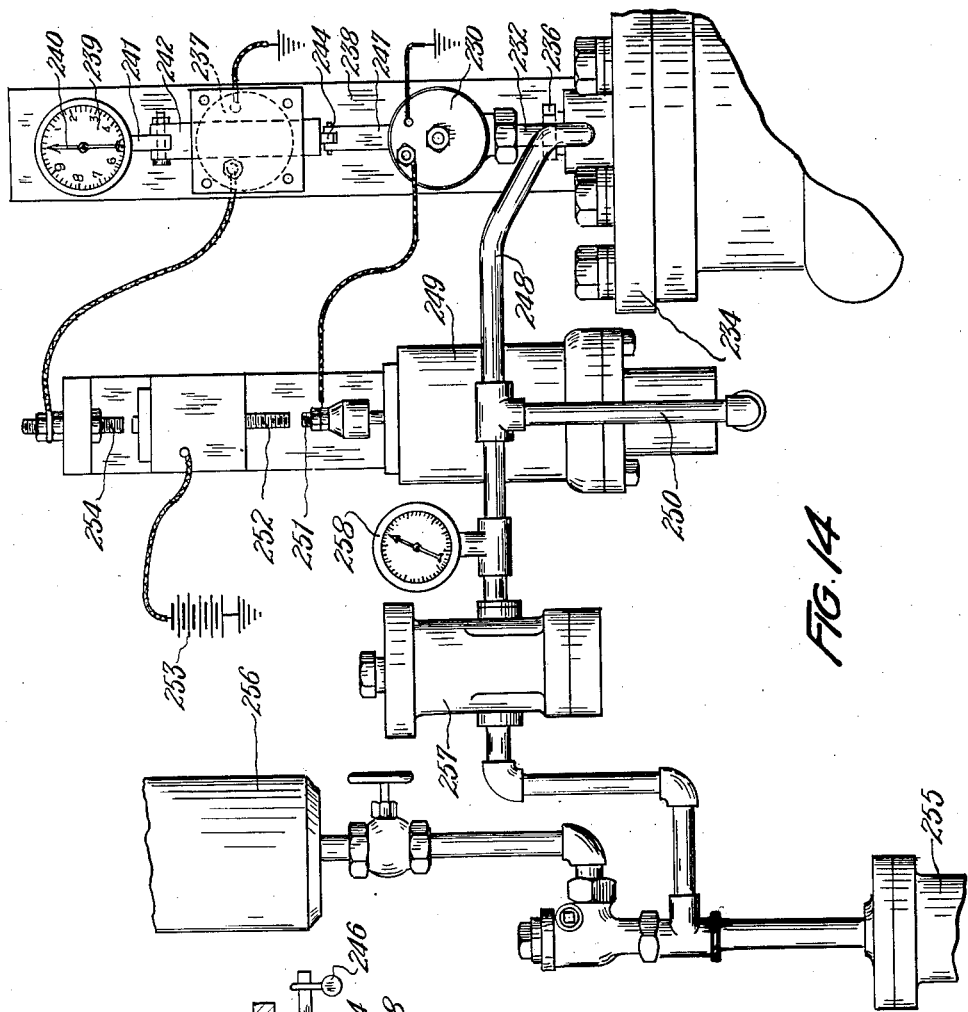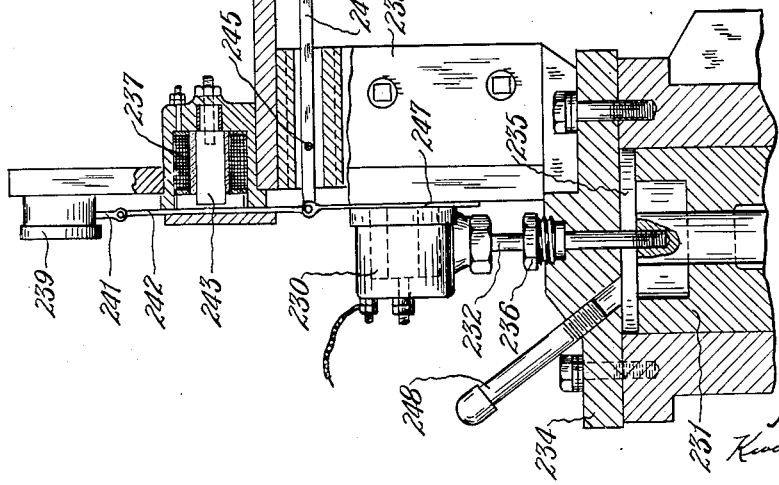

Patented July 23, 1935

2,009,314

UNITED STATES PATENT OFFICE 2,009,314

HARDNESS TESTING APPARATUS

Joseph Gogan, Lakewood, Ohio

Application April 20, 1932, Serial No. 606,367

43 Claims. (Cl. 265—14)

This invention relates to new and improved testing apparatus, by means of which various bodies or articles can be individually tested with great rapidity and accuracy, and without impairment of the utility of the bodies or articles.

As one of its objects this invention aims to provide testing apparatus of the type having means for distorting a test piece by the application of a predetermined force thereto and embodying novel means for measuring such distortion.

Another object of this invention is to provide testing apparatus of improved form having means for indicating distortion produced in a test piece and embodying novel means for rendering the indicating means effective and ineffective.

Another object of this invention is to provide testing apparatus having relatively movable means for distorting a test piece and means for measuring the test piece distortion, and wherein electromagnetic means is employed for rendering the measuring means responsive to the relative movement of the distorting means.

A further object of this invention is to provide an improved hardness testing apparatus having an impression member which is adapted to be moved into engagement with a test piece by a preliminary force and to be pressed into the test piece by a predetermined force in excess of the preliminary force, and wherein means for measuring the movement of the impression member into the test piece, includes an indicator, an electromagnetic means responsive to the applied force for operably connecting the indicator with, and disconnecting the same from the impression member.

Still another object of this invention is to provide improved hardness testing apparatus having an impression member which is adapted to be actuated by fluid pressure, and also having novel fluid supply means for causing an initial rapid movement of the impression member into engagement with a test piece, and a subsequent relatively slow movement of the impression member into the test piece.

It is also an object of this invention to provide improved testing apparatus having a contact member for distorting a test piece and a cylinder for actuating the contact member, and embodying means for supplying motive fluid to the cylinder at a constant rate during the distortion of the test piece.

Another object of the invention is to provide improved testing apparatus having a test piece distorting member and cylinder for actuating the same by fluid pressure, and embodying means for supplying pressure fluid to the cylinder at a constant rate during the distortion of the test piece and means for rendering the pressure fluid supply means ineffective when the fluid pressure reaches a predetermined value.

It is a further object of this invention to provide testing apparatus of the type referred to, which embodies novel control means rendering the apparatus automatic in operation, so that individual pieces can be tested in rapid succession and with a high degree of accuracy.

Other objects and advantages of the invention will be apparent from the following description, when taken in conjunction with the accompanying sheets of drawings, wherein, Fig. 1 is a front elevational view of a testing machine embodying my invention;

Fig. 3 is a sectional elevation showing the impression member and gauge operating means, taken substantially on line 3—3 of Fig. 1.

Fig. 4 is a sectional elevation taken substantially on line 4—4 of Fig. 1, and showing pressure responsive control means;

Fig. 6 is a vertical sectional view of the fluid pressure supply pump, taken substantially on line 6—6 of Fig. 5; and Fig. 7.

Fig. 7 is a transverse sectional view of the pump taken on line 7—7 of Fig. 6;

Fig. 14 is a partial elevational view showing another form of testing apparatus embodying my invention, and Fig. 15 is an elevational view thereof, partly in section.

Figure 1:
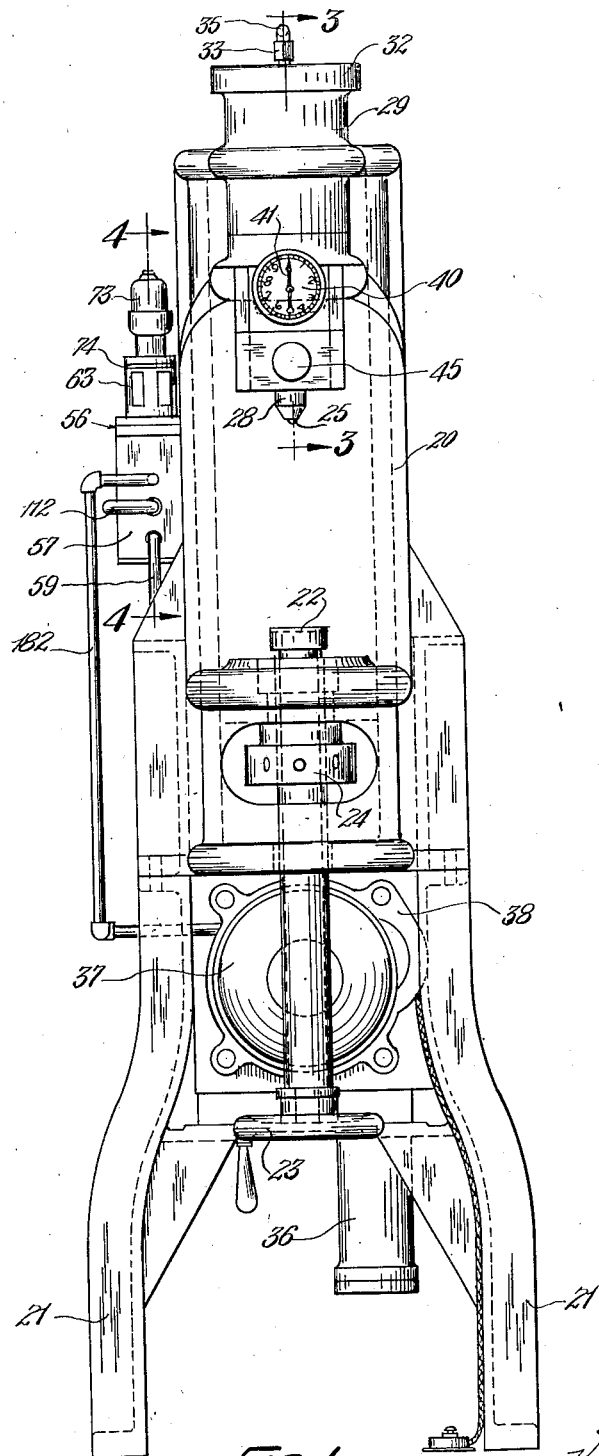
Figure 2:
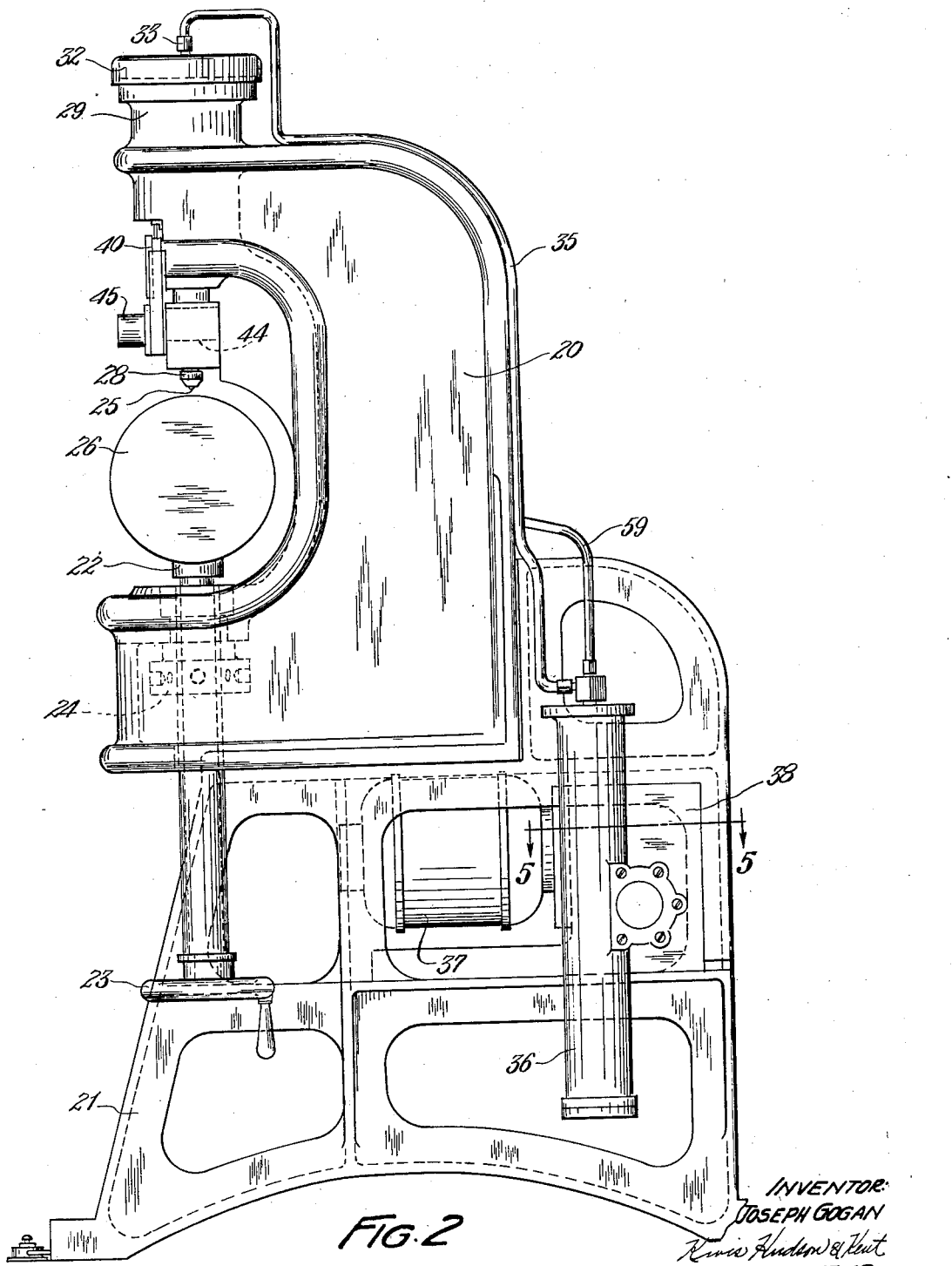
Fig. 2 is a side elevational view thereof.

Detailed reference will now be made to the accompanying drawings, wherein I have illustrated new and improved apparatus for rapidly and accurately testing individual bodies. In disclosing my invention I have illustrated what I now regard as a preferred form of my testing apparatus, but it should be understood, however, that my invention may be embodied in various other forms of testing apparatus. Before proceeding with the detailed description of the testing apparatus illustrated in the drawings, it is pointed out that, in general, my invention provides for the testing of individual bodies or pieces by applying to each body, a force of definite or predetermined value, and accurately measuring the corresponding distortion produced in the body. I am aware that various kinds of testing apparatus have been proposed heretofore, wherein measurement of the distortion produced in a test piece by a predetermined force has been attempted, but in the main such apparatus has been impractical, principally because of the inability of the apparatus to accurately measure the distortion produced in the test piece.

According to my invention, as will be explained in detail hereinafter, I provide electromagnetic means for rendering the measuring means responsive to the distortion produced in the test piece, and by this means I am able to obtain an instantaneous and very accurate indication of such distortion. My invention also provides a novel form of fluid pressure supply means, which makes possible a desired relatively rapid movement of a distorting member into engagement with a piece to be tested, and a subsequent relatively slow, but uniform movement of the member in distorting the test piece. As will be explained more in detail hereinafter, this electromagnetic means, as well as the novel fluid pressure supply means and the control therefor, enable an unskilled operator to perform accurate tests upon individual pieces in rapid succession.

In the embodiment of the invention illustrated in the drawings, I have shown a hardness testing machine which operates in conformity with the general principle of the Brinell test, wherein the depth of a recess produced in a piece of metal by pressing a spherical impression member thereinto, is proportional to the force required to produce the distortion. It should be understood, however, that in my improved testing machine it is not necessary that the impression member be spherical in shape, but may be of other form or construction, such as a diamond pointed member. It should be understood, that although in this instance my invention is embodied in a hardness testing machine, it may, if desired, also be embodied in various other kinds of testing apparatus wherein the distortion produced in the material is proportional to the applied force, such as in apparatus for measuring compression, tensile and torsional characteristics of various bodies or materials.

The hardness testing machine illustrated in the drawings is provided with a suitable frame 20, preferably, though not necessarily, of the gap type having supporting legs 21 and also having a test piece support 22. The test piece supporting means may be of a conventional type which is more or less diagrammatically shown in the drawings as comprising an anvil mounted on the upper end of a vertically extending adjusting screw. The adjusting screw is adapted to be rotated by means of the hand wheel 23 for varying the position of the anvil, and is adapted to be clamped in the desired position of adjustment by means of the lock nut 24 through which the screw extends. A suitable impression member, preferably in the form of a hardened spherical ball 25, is adapted to be moved into engagement with a test piece, such as the body 26 resting upon the support 22, by means of the movable ball holder or plunger 27. This plunger is mounted in the frame 20, above, and in substantial vertical alignment with, the support 22, and is adapted for vertical sliding movement in the frame to move the ball toward or away from the test piece. The ball may be mounted on the plunger by providing the latter with retaining means of suitable form, such as the retaining chuck 28 shown in the drawings.

The portion of the frame in which the plunger 27 is slidably mounted is provided with a cylinder 29, into which the upper end of the plunger extends. A piston 30 is slidably mounted in this cylinder and is rigidly clamped to the upper end of the plunger by means of the nut 31. The cylinder is closed at its upper end by a cover 32, having a fluid pressure inlet fitting 33 for admitting motive fluid, such as a suitable oil, under pressure, to the cylinder to actuate the piston therein and thereby move the ball 25 into engagement with the test piece. Any suitable means may be provided for moving the ball in a direction away from the work, such as the coil spring 34 which is disposed around the upper portion of the plunger 27 and engages the underside of the piston 30. This spring opposes downward movement of the piston and at all times tends to move the ball upwardly away from the test piece.

Fluid pressure is supplied to the cylinder 29 through a pipe 35 leading from the upper end of a pump 36. As will be explained more fully hereinafter, this pump is driven by an electric motor 37, through mechanism contained in the transmission casing 38 and including a clutch which is controlled by a solenoid 39. Without disclosing the detailed structure of the pump at this point of the description, it is pointed out that the pump is capable of supplying a large volume of motive fluid to the cylinder 29 at a suitable initial or preliminary pressure value, which may be approximately twenty pounds to the square inch, for rapidly moving the ball 25 downwardly into contact with the test piece, and a relatively small volume of motive fluid, at a higher and progressively increasing pressure, but at a constant rate of delivery, for subsequently moving or pressing the ball into the test piece at a relatively slow, but uniform, rate. The initial pressure of approximately twenty pounds to the square inch, causes the ball to be rapidly lowered into contact with the test piece, so that valuable time will not be lost in bringing the ball into position for making a test.

The higher subsequent pressure applied to the ball, causes the latter to distort the test piece by being depressed into the material of the piece at a slow, but uniform, rate. The rate of movement of the ball will be different for different materials, and may be different for each of several pieces of the same material, but according to my invention, the rate of travel or velocity of the ball will, in each test, be uniform throughout the full distance that the ball moves into the test piece. I find that by providing for such a slow, but uniform, movement of the ball into the piece, the test readings are not rendered inaccurate, as by the inherent resilience, or other characteristic of the material being tested, such as the tendency for the material to flow or burr up around the ball.

For indicating or measuring the extent of movement of the ball 25 into the test piece, I employ a suitable gauge 40 which is mounted upon the frame of the machine. This gauge may be of any desired form and, in this instance, embodies a movable pointer 41, which is adapted to be rotated in one direction by downward movement of a stem 42 projecting from the casing of the gauge, and to be rotated in the opposite direction by a spring which is contained within the gauge housing and normally tends to oppose downward movement of the stem. According to my invention, I provide means for operatively connecting the gauge stem 42 with the plunger 27 at the instant that the ball begins to enter the test piece, and for disconnecting the stem from the plunger and temporarily locking the gauge pointer for reading by the operator when the force applied to the ball reaches a predetermined or definite value.

In the drawings, I have shown this gauge operating or control means as including an elongated relatively thin strip 43 of magnetizable material, which is loosely connected to the lower end of the stem 42, and which extends downwardly between the oppositely disposed electromagnets 44 and 45. The magnet 44 is arranged for movement with the plunger 27, preferably by being mounted in the plunger adjacent the lower end thereof. The electromagnet 45 is stationarily mounted in an opening in the supporting member 46 which is secured to the frame 20. These electromagnets may be of any suitable form of construction, and in this instance, the magnet 44 is shown as having a magnetizable core 47 surrounded by a winding 48, and as having an outer casing 49, preferably of non-magnetic material, the entire magnet and outer casing assembly being retained in an opening provided in the plunger 27 by a clamping nut 50 applied to one end of the core. The electromagnet 45 is similarly constructed, being provided with a magnetizable core 51, which is surrounded by a winding 52. As shown in the drawings, this magnet may be retained in an outer, preferably non-magnetic, casing 53 mounted in an opening of the support 46, by means of a nut 54 applied to the outer end of the core 51.

The magnetizable member 43 is made sufficiently long to extend down past the adjacent ends of the magnet cores 47 and 51, so that it can be swung laterally in either direction, as seen in Fig. 3, by energizing one or the other of the magnets. When the ball 25 is moved downwardly into contact with the test piece by the preliminary pressure, the magnet 44 is energized, by means to be explained hereinafter, thereby causing the member 43 to be drawn toward the core 47. The movement of this member, under the influence of the core 47, causes it to be tightly held against the face of the outer casing 49 and, in a sense, to be connected with the plunger 27. Thus the casing 49 constitutes an abutment means against which the gauge operating member 43 is releasably clamped by the magnet 44.

As the plunger continues its downward movement to press the ball 25 into the test piece, the member 43 moves downwardly with the plunger, thereby causing the stem 42 to be moved downwardly and the pointer of the gauge to be rotated. When the force being exerted upon the ball 25 reaches a predetermined value, the magnet 45 is energized by control means, which will presently be explained, to disconnect the member 43 from the plunger. It should be stated at this point, that the magnet 45 is so constructed that it is capable of producing a considerably stronger magnetic field than the magnet 44, and when the winding 52 is energized the member 43 will be attracted away from the magnet 44. The movement of the member 43, under the influence of the magnet 45, causes this member to be disconnected from the plunger 27 and to be tightly held against the inner face of the outer casing member 53, thereby locking the gauge stem 42 against being retracted by the spring within the gauge housing, and thereby locking the pointer of the gauge at the setting thereof corresponding with the predetermined pressure exerted on the ball. While the magnet 45 remains energized the pointer of the gauge is locked against movement in either direction, and its position at this time is noted by the operator, from which reading or indication the hardness characteristic of the piece being tested, may be determined.

For controlling the energization of the magnets 44 and 45, so that the gauge actuating member 43 will be connected for movement with the plunger and disconnected therefrom at the proper time, I provide a control unit or device 56 which responds to the fluid pressure supplied to the cylinder 29. This control unit may be located at any convenient point and, in this instance, is shown as being provided with a casing 57, which is mounted upon the frame of the testing machine at an elevation above the transmission casing 38. The casing 57 is provided with a cylinder 58, to which fluid pressure is supplied from the pump 36 through a connecting pipe 59. A plunger 60 is slidably fitted in the cylinder 58 and has a stem 61, which extends upwardly through the cover 62 into a housing 63, the latter forming a part of a switching device mounted upon the cover. The upper end of the cylinder 58 is enlarged to form a chamber 64, through which the stem 61 extends. A coil spring 65 is disposed in this chamber in surrounding relation to the stem 61 and with its ends in engagement, respectively, with the cover and with a shoulder 66 located at the junction of the stem with the upper end of the plunger 60. This spring normally maintains the plunger in its lowermost position with the shoulder 66 acting as a stop to limit the downward movement of the plunger.

At the upper end of the stem 61 I provide a suitable contact 68 which is carried in a sleeve 69, the latter being mounted on the upper end of the stem but insulated therefrom by the insulating bushing 69'. This contact member is preferably threadedly connected to the sleeve 69 so as to be adjustable relative to the stem, and may be retained in the desired position of adjustment by means of the clamping nuts 70.

The contact member 68 cooperates with a contact member 71 which is carried by a sleeve 72, the latter being slidably mounted in a housing 73 which is insulated from the housing 63 by a suitable insulating body 74 interposed therebetween. A coil spring 75 is disposed around the sleeve and normally maintains the contact member 71 in its lowermost position with the bottom of the sleeve engaging the abutment 76. The sleeve is provided at its upper end with an opening 77 leading to the hollow interior of the sleeve. A contact member 78 extends through the opening 77 and is formed with a body portion 79, which is slidable within the sleeve. A coil spring 80 is disposed within the sleeve and normally maintains the body portion 79 in engagement with the upper end of the sleeve with the contact member 78 extending outwardly through the opening 77, as shown in Fig. 4 of the drawings.

A stationary contact member 82 is mounted in the housing 73 above the contact member 78, and is adapted to be engaged by the latter. The contact member 82 is insulated from the housing, as by means of the insulating bushing 83, and is provided at its upper end with a threaded terminal to which a conducting wire 84 may be attached. A similar conducting wire 85 extends through an opening in the wall of the housing 63 and is attached to the contact member 68, and a third conductor 86 is attached to the housing 73 which, as pointed out above, is insulated from the contact member 82 and from the contact member 68.

Figure 12:
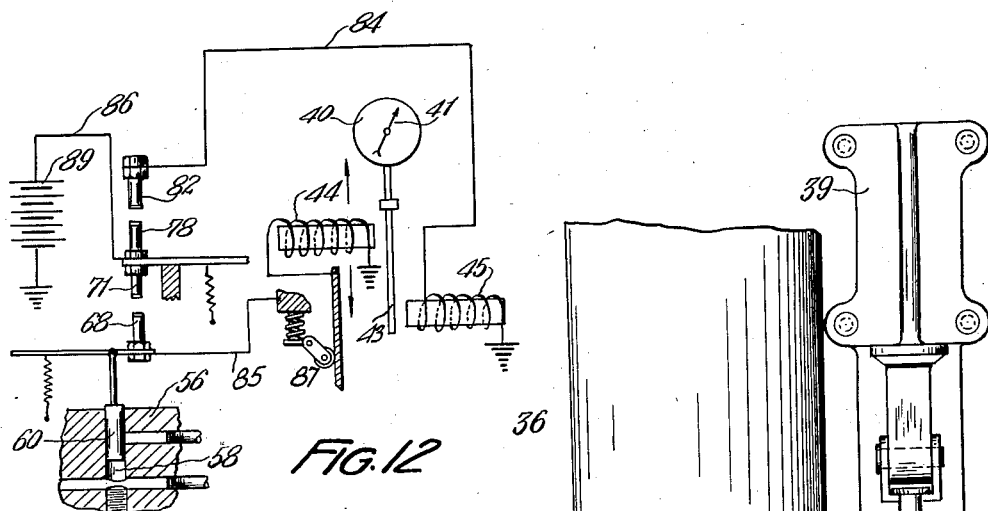
Fig. 12 is a diagrammatic view showing the electromagnetic control for the distortion indicator.

As diagrammatically shown in Fig. 12, the conductor 84 is connected to one end of the winding of the electromagnet 45, and the conductor 85 is connected to one end of the winding of the electromagnet 44 through a contact device 87 which will be presently described. As shown in Figs. 3 and 12 of the drawings, the opposite ends of the winding of the electromagnets 44 and 45 are grounded to the frame of the machine by being connected to screws 88 extending into the outer casings of the magnets. The conductor 86 is connected to any source of electric current of suitable characteristic, and in this instance, I connect this conductor to a source of non-pulsating current, such as to one terminal of the storage battery 89. The opposite terminal of this battery is grounded to the frame of the machine so that energizing circuits may be established through the windings of the electromagnets 44 and 45.

The coil spring 65, and the cross-sectional area of the plunger 60, are so proportioned that the spring will prevent upward movement of the plunger when the latter is subjected to only the preliminary pressure supplied by the pump for moving the impression member 25 into engagement with the piece to be tested. The spring and plunger are so designed, however, that when the fluid pressure begins to increase, by reason of the resistance which the test piece offers to the downward movement of the ball 25, the plunger immediately responds to the pressure increase and moves upwardly against the action of the spring and causes the contact 68 to engage the contact 71, whereupon current flows from the battery through the conductor 86, the contacts 71 and 68 and through conductor 85 to the winding of the electromagnet 44. Energization of this electromagnet causes the gauge actuating member 43 to be clamped to the plunger 27 for movement therewith. As the ball 25 continues to move into the test piece, the plunger 60 continues to move upwardly, and when the fluid pressure increases to the predetermined definite value required to compress the springs 65 and 75 sufficiently to cause the contact 78 to engage the contact 82, which may be a pressure of five hundred and fifty pounds per square inch, current thereupon flows from the battery through the contacts 78 and 82 and the conductor 84 to the winding of the electromagnet 45. The energization of this winding causes the gauge actuating member 43 to be attracted away from the plunger 27 and to be stationarily held against the casing 53, as explained above, whereupon the operator notes the position of the pointer of the gauge 40.

Since the electromagnet 44 moves with the plunger 27, it may be desirable to supply current to this magnet through a contact device, such as the contact device 87 shown in Fig. 3. This contact device comprises a contacting plate or strip 90, carried by the plunger 27 and to which one end of the winding 48 is connected, and a contact roller 91 which engages the conducting strip. This roller is carried by an arm 92 which is pivotally mounted on the insulated housing 93. A coil spring 94 is interposed between one end of the arm 92 and the wall of the housing 93 for pressing the roller against the contact strip and to form an electrical connection between the insulated housing and the pivoted arm. The conductor 85, which is connected to the contacts 68, may be connected to the housing 93 as by means of the screw 94'.

The housing of the control unit is also provided with a cylinder 95 which communicates with cylinder 58 through the passage 96. The cylinder 95 is of somewhat larger diameter than the cylinder 58 and is fitted with a slidable plunger 97. This plunger is provided with a stem 98 which projects into an enlargement formed at the upper end of the cylinder 95. A coil spring 100 is disposed around the stem 98 and engages a laterally extending shoulder or flange 101 provided on the plunger, and normally tends to move the plunger downwardly in its cylinder, such downward movement being limited by the shoulder 101 engaging the bottom of the enlargement 99. The spring 100, and the cross-sectional area of the plunger 97, are so proportioned that the plunger will be moved upwardly, by the pressure of the motive fluid which causes the ball 25 to be pressed into the test piece, thereby utilizing some of the pressure fluid and maintaining the downward movement of the ball at a relatively slow rate. Movement of this plunger in opposition to the force of the spring also causes this plunger to function as a surge absorbing device, which takes up or absorbs pulsations which may occur in the pressure fluid being delivered by the pump.

The casing 57 of the control unit is provided with a third cylinder 103, in which a plunger 104 is slidably fitted. The upper portion of this cylinder is enlarged to provide a chamber 105, into which the stem 106 of the plunger 104 extends. A spring 107 is disposed in the chamber 105, so as to surround the stem and to normally move the plunger downwardly in the cylinder by cooperating with a laterally extending shoulder or collar 108, which functions as a stop for limiting such downward movement of the plunger. The stem 106 preferably extends upwardly through the cover 62, as shown in Fig. 4 of the drawings, and cooperates with the actuating member 109 of an electric switch 110 which is disposed in the circuit of the solenoid 39. The switch 110 is so constructed that it is normally closed, but when opened by upward movement of the actuating member 109, it causes the circuit of the solenoid 39 to be opened. As will be explained more fully hereinafter, the opening of the solenoid circuit terminates the power stroke of the pump to thereby cut off the supply of pressure fluid to the cylinder 29 and to the control unit 56.

It will be noted from the arrangement illustrated in Fig. 4, that pressure fluid is not supplied directly to the cylinder 103 from the pump 36, but is supplied to this cylinder through a pipe 112 which leads from a recess 113 formed in the casing 57 around the plunger 60. The plunger 60 is so proportioned as to length that it extends through the recess 113 and cooperates with the wall thereof in the manner of a valve to control the flow of fluid into the pipe 112. In thus supplying pressure fluid to the cylinder 103 through the recess 113, it will be seen that the plunger 104 cannot be actuated to open the circuit of the solenoid until after the plunger 60 has been moved upwardly enough to cause the pairs of contacts 68, 71 and 78, 82 to be closed in succession to energize the electromagnets 44 and 45. Since actuating fluid is not supplied to the cylinder 103 until after the contacts 68 and 78 have been moved into engagement with the contacts 71 and 82, it will be seen that the solenoid 39 will not be deenergized to terminate the supply of pressure fluid until after the ball 25 has been pressed into the test piece and the operator has had an opportunity to read the gauge 40.

After the solenoid 39 has been deenergized by upward movement of the switch member 109 and the supply of pressure fluid has been terminated, the plunger 60 will move downwardly under the action of the spring 65 and prevent further flow of fluid in either direction through the pipe 112. To relieve the pressure trapped in this pipe and in the cylinder 103, so that the plunger 104 may be moved downwardly by the spring 107, I provide a relief passage 114 which communicates with the cylinder 103 and with the bore of the cylinder 95, through a port 115. To enable the plunger 97 to cooperate with the port 115 in the nature of a valve, I provide the plunger with an annular recess 116 which registers with this port when the plunger is in its lowermost position, as illustrated in Fig. 4. When the plunger is in this position, fluid may pass from the cylinder 103 through the passage 114 to the annular recess 116, and thence into the chamber 99 through a passage 117 which extends upwardly through a portion of the body of the plunger. It will be seen from the arrangement just described that when pressure fluid is supplied to the cylinder 29 to press the ball 25 into the test piece, the same fluid pressure acts upon the plungers 60 and 97 of the control unit. As this pressure increases and moves the plunger 60 upwardly, to thereby actuate the contacts 68 and 78 and to allow fluid to pass through the pipe 112 to the cylinder 103, the plunger 97 is also moved upwardly by the fluid pressure and closes the port 115. The plunger 104, then being subjected to the pressure of the motive fluid, is moved upwardly to open the switch 110. The opening of this switch causes the pressure fluid supply to be cut off allowing the plungers 60 and 97 to descend in their cylinders under the action of the springs 65 and 100. The downward movement of the plunger 97 brings the annular recess 116 into registry with the port 115, thereby relieving the pressure trapped in the cylinder 103 by placing this cylinder in communication with the chamber 99.

Reverting now to the fluid pressure supply unit previously referred to as comprising the pump 36, motor 37 and transmission 38, it will be noted that this unit is designed to be compactly mounted upon the frame 20 of the testing machine. If desired, however, this unit may occupy any other suitable location. As seen in the drawings, the pump of the pressure supply unit is of the reciprocating type and is provided with a vertically elongated, substantially cylindrical outer housing 119, which may be supported upon the transmission casing 38. The housing 119 is closed at its upper end by a cover 120 having a plunger 121 mounted thereon to extend into the casing. The plunger is mounted upon the cover by providing the hollow plunger stem 122, with a shoulder 123, for engagement with the underside of the cover, and with a threaded portion 124 which extends through the cover for cooperation with the hollow clamping nut 125. The opening in the stem 122 provides the pump with a discharge passage 126 which communicates with the hollow interior of the nut, and through which pressure fluid may be supplied to the pipes 35 and 59 for delivery, respectively, to the cylinder 29 and the control unit 56. The opening in the stem also extends downwardly through the plunger 121 to form a cylinder 127 of small diameter, in which a plunger 128 of correspondingly small diameter is slidable. The plunger 128 is mounted within a larger cylinder 129, which is slidable within the outer casing 119 for cooperation with the stationary plunger 121. The plunger 128 is preferably mounted within the cylinder 129 by providing the plunger with a supporting stem 130. This stem extends downwardly in the movable cylinder 129 and is secured to the lower end of this cylinder by means of a suitable connection 131 which, in this instance, also forms a cage for the check valve ball 132.

The cylinder 129 is provided on its outer surface with a rack 133, which is engaged by the pinion 134, so that upon rotation of the pinion in one direction or the other, the cylinder may be moved upwardly or downwardly within the outer casing 119. Fluid is admitted to the cylinder 129, as the latter is moved downwardly, through a passage 135 which is controlled by the ball 132. Upon upward movement of the cylinder fluid is forced outwardly into the delivery passage 126 through one or more longitudinal grooves 136 formed in the inner wall of the cylinder 127 adjacent the lower end thereof. As the cylinder 129 is moved upwardly the plunger 128 is moved upwardly with it, and fluid will continue to be forced outwardly through the grooves 136, until the top of the plunger 128 overlaps the upper ends of these grooves and closes the same, whereupon communication between the passage 126 and the interior of the cylinder 129 is completely cut off.

For regulating the pressure of the fluid which is forced outwardly through the passage 126 prior to the closing of the grooves 136 by the plunger 128, I provide a pressure regulating means in the nature of a check valve, comprising a valve member 137 which is disposed around the stem 122 and is slidable thereon for cooperation with a plurality of passages 138 extending through the plunger 121. This valve member is normally held against the plunger by means of a coiled spring 139, which is disposed around the stem 122. The spring 139 and the cross-sectional area of the passages 138 are so proportioned that the valve member 137 will be lifted by the fluid pressure when the latter reaches the value desired for the preliminary pressure, which may be approximately twenty pounds to the square inch. Thus it will be seen that as the cylinder 129 is moved upwardly by the pinion 134, fluid will be forced out through the grooves 136 and the passage 126, for delivery to the cylinder 29 and to the control unit 56 at the preliminary pressure value.

Should there be a tendency toward an increase in this pressure value, the valve member 137 will be unseated and some of the fluid in the cylinder 129 will be forced upwardly through the passages 138 into the chamber 140 formed in the upper portion of the housing 119.

After the cylinder 129 has been moved upwardly through a sufficient distance to cause the plunger 128 to close the grooves 136, the delivery of fluid to the cylinder 29 at the preliminary pressure value is cut off, and as the cylinder continues to move upwardly the plunger 128 begins to act upon the fluid in the cylinder 127 and in the passage 126. It should be noted at this point that the diameter of the cylinder 129 is relatively large as compared with the diameter of the plunger 128, and consequently the initial upward movement of the cylinder causes a relatively large volume of fluid to be forced out through the passage 126, whereas the upward movement of the plunger 128, subsequent to the closing of the grooves 136, causes only a small volume of fluid to be forced outwardly through the passage 126. Delivery of a large volume of fluid at the preliminary pressure value is desirable, as explained heretofore, for causing an initial rapid movement of the ball 25 into engagement with the piece to be tested. The subsequent relatively slow movement of the ball 25 into the test piece is obtained by the action of the plunger 128 in forcing a relatively small volume of fluid outwardly through the passage 126 at a high pressure. It will be understood, of course, that the relative area of the plungers 121 and 128 may be varied in accordance with the different pressure values or volumes which may be desired.

Since the closing of the grooves 136 by the plunger 128, cuts off communication between the cylinder 129 and the passage 126, the fluid remaining in the cylinder performs no further function, and to provide for the escape of this fluid without requiring the expenditure of work in moving the valve member 137, I provide one or more grooves 142 in the inner surface of the cylinder 129. These grooves extend for the major portion of the length of the cylinder, so that immediately after the plunger 128 closes the grooves 136, the grooves 142 will be opened above the plunger 121, to thereby provide direct communication between the cylinder 129 and the chamber 140. As the cylinder 129 and plunger 128 continue to move upwardly, fluid will flow freely from the cylinder 129, through the passage 142 into the chamber 140. To allow the fluid to leave the chamber 140, I provide one or more grooves 143 in the outer surface of the cylinder 129, as shown in Figs. 6 and 7 of the drawings. The grooves 143 extend for the full length of the cylinder, so that the chamber 140 will always be in communication with the oil reservoir or cylinder 144 formed by the lower portion of the outer casing 119.

To provide for the desired reciprocation of the cylinder 129 by the pinion 134, I employ suitable mechanism which is housed in the transmission casing 38, and which is driven by the motor 37. This mechanism includes a drive shaft 146, to which the pinion is keyed, and which is rotatably supported in the casing 38 by suitable bearings 147 and 148. Intermediate the bearings 147 and 148, this shaft forms a support for a pair of rotatable clutch members 149 and 150, and for a clutch member 151 which is slidably splined to the shaft for selective cooperation with the clutch members 149 and 150. The clutch member 149 is carried by a spur gear 152, which is, in turn, carried by a worm gear 153. The spur gear and worm gear are rotatably journaled on the shaft 146, with the worm gear meshing with a driving screw 154. This screw is rotatably supported in the housing by suitable bearings 155 and 156, and is driven from the motor 37 through spur gears 157 and 158. The spur gear 152 meshes with a spur gear 159, which is drivingly secured to a countershaft 160. A spur gear 161 is secured to the opposite end of the countershaft and meshes with an idler spur gear 162. The idler gear 162 meshes with a spur gear 163 which is journaled upon the shaft 146 and to which the clutch member 150 is secured. It will be seen from the arrangement of gearing just described, that as the motor 37 operates continuously in one direction, the clutch member 149 will be driven in one direction at a desired speed, while the clutch member 150 will be driven in the opposite direction, and by moving the clutch member 151 into engagement with one or the other of these rotating clutch members, the pinion 134 will be rotated to move the pump cylinder in the desired direction.

As stated above, it is essential to the accuracy of my testing apparatus that the test ball be moved in into the material of the test piece at a slow rate and also at a rate which is absolutely uniform. In my testing apparatus I attain the desired slow rate of movement of the ball into the test piece, by the novel form of pump structure just described, and attain a uniform movement of the ball into the test piece by employing a synchronous motor, as the electric motor 37, which drives the pump 36. It is characteristic of a synchronous motor that the driving speed is constant for variable loads within the rating of the motor, and in my testing machine the synchronous motor 37 drives the plunger 128 at a uniform rate of speed and causes pressure fluid to be supplied to the cylinder 29 at a constant rate, with the result that the ball 25 is moved into each test piece at a velocity or rate of speed that is uniform for the full travel of the ball into the piece.

Any suitable means may be used to actuate the clutch member 151, and in this instance I provide a forked lever 165 having operative engagement with the movable clutch member, and a lever 166, which cooperates with the solenoid 39, and which actuates the forked lever through the rock shaft 167. The lever 166 may be connected to the solenoid in any suitable manner, but I prefer to form this connection by providing the solenoid plunger with a stem 169, which extends through the lever. To connect the lever 166 with the stem 169 in such a manner as to permit limited relative movement therebetween, I provide a pair of coil springs 170 and 171, which surround the stem and are disposed on opposite sides of the lever. The compression of these springs may be adjustably varied by moving the nut 172 toward or away from the shoulder or abutment 173. If desired, the lower end of the solenoid stem 169 may be extended to cooperate with the guide bearing 174, for guiding the reciprocating movements of this stem.

Figure 8:
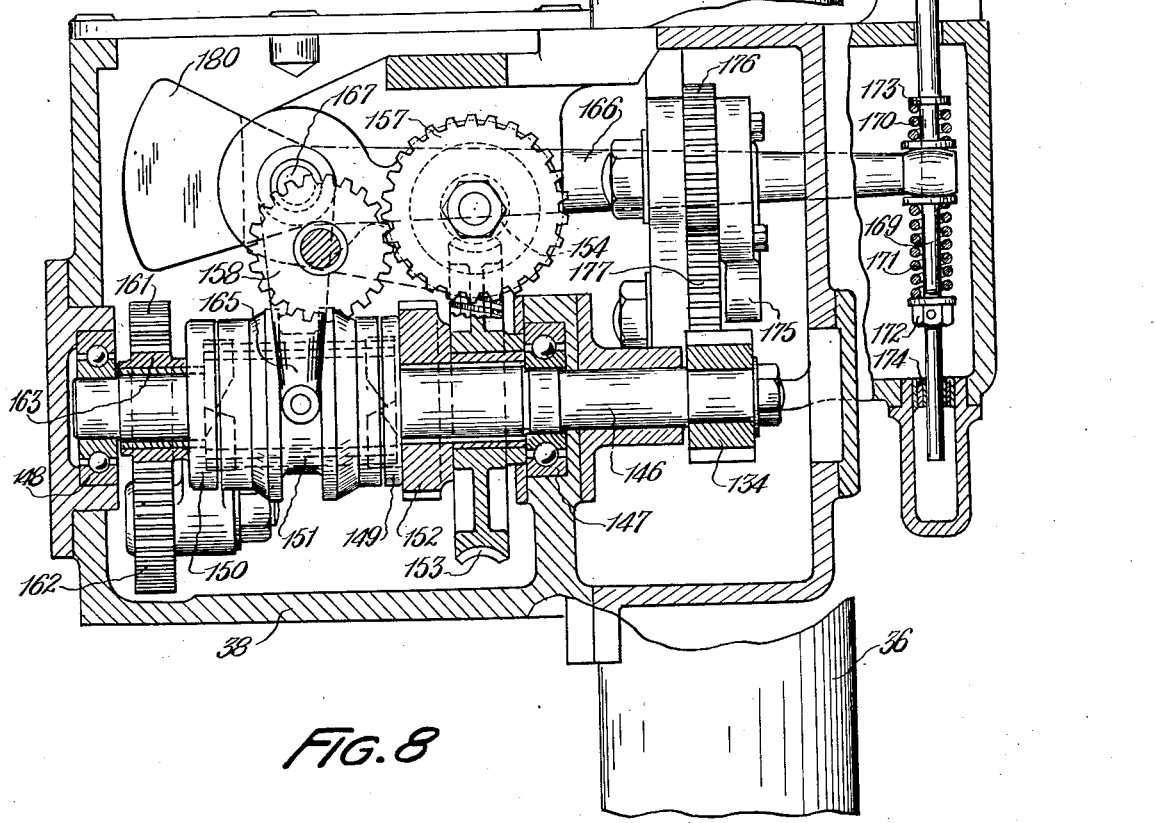
Fig. 8 is a sectional elevation of the pump actuating means taken substantially on line 8—8 of Fig. 5.
Figure 10:
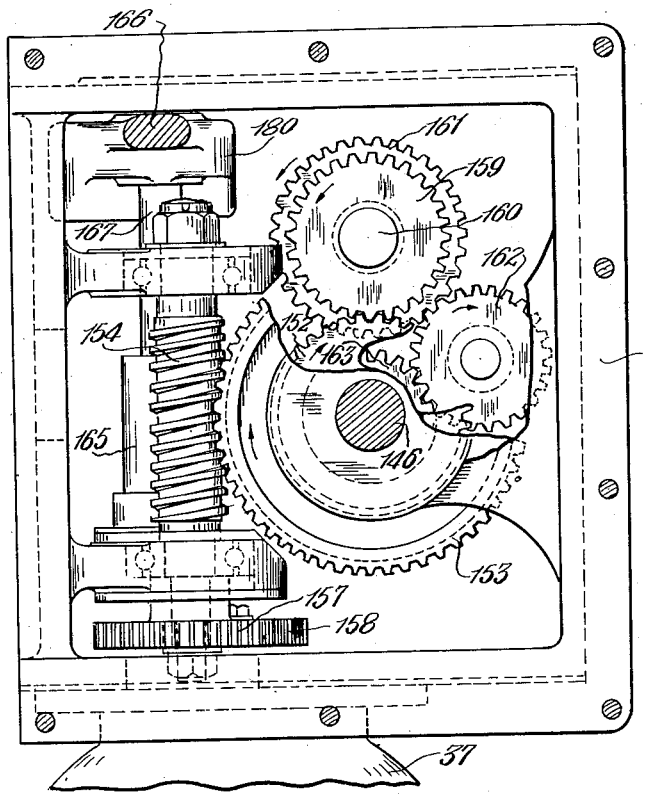
Fig. 10 is a sectional elevation taken through the pump actuating means on line 10—10 of Fig. 5.

When the solenoid 39 is energized, the stem 169 is lifted, causing the lever 166 to rock the shaft 167 and thereby swing the forked lever 165 with the result that the clutch member 151 is shifted to the right, as seen in Fig. 8, into engagement with the clutch member 149. The engagement of these clutch members causes the shaft 146 to be driven in a direction to raise the pump cylinder 129 to thereby deliver pressure fluid to the cylinder 29 and to the control unit 56. When the switch 110 is opened and the solenoid is thereby deenergized, the lever 166 drops downwardly, thereby causing the clutch member 151 to be disengaged from the clutch member 149 and to be moved into engagement with the clutch member 150. This shifting of the clutch member 151 into engagement with the clutch member 150 causes the shaft 146 to be rotated in the opposite direction, or, in other words, in a direction to cause the pump cylinder 129 to be lowered.

Figure 11:
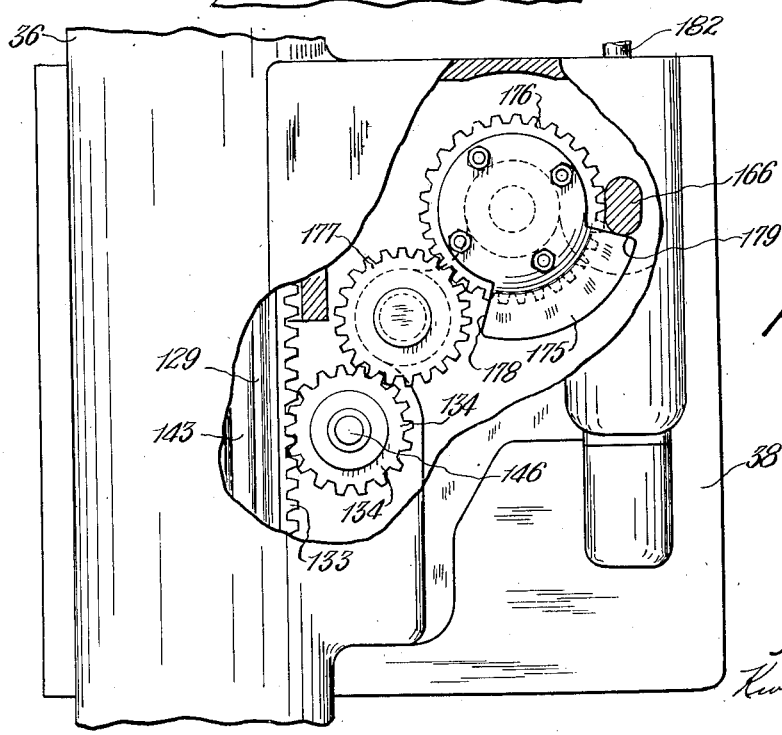
Fig. 11 is an elevational view of the pump actuating means with a portion of the transmission casing broken away to show the clutch operating mechanism.

When the pump cylinder approaches its lowermost position, it is necessary that the clutch member 151 be moved out of engagement with the clutch member 150 and into a neutral position intermediate the clutch members 150 and 149 preparatory to the next power stroke of the pump. To this end I provide a cam 175, which is arranged to engage the lever 166 to shift the clutch member to the neutral position. The cam 175 is carried by a spur gear 176, which is driven from the pinion 134 through an idler gear 177, as shown in Fig. 11 of the drawings. With the clutch member 151 in its neutral position, as shown in Fig. 8, the cam 175 and the lever 166 occupy substantially the position illustrated in Fig. 11. As the pump cylinder 129 is moved upwardly by the pinion 134, the cam travels in a clockwise direction, as seen in Fig. 11, and moves away from the lever. This cam, and the driving gears therefor, are so designed that the upward travel of the pump cylinder will be stopped by the opening of the solenoid circuit before the face 178 of the cam engages the top edge of the lever 166. As the pump cylinder 129 is moved downwardly by the rotation of the pinion 134 in the opposite direction, the cam 175 is rotated in a counter-clockwise direction, as seen in Fig. 11, and as the pump cylinder approaches its lowermost position the face 179 of the cam engages the underside of the lever 166 and lifts the latter to throw the clutch member 151 out of engagement with the clutch member 150 and into the neutral position illustrated in Fig. 8. In connection with the actuation of the lever 166 by means of the cam 175, it is pointed out that the weight of this lever and of the solenoid plunger and stem 169 are so proportioned, relative to the counterweight 180, that when the solenoid is deenergized the bell crank lever will, of itself, shift the clutch member 151 out of engagement with the clutch member 149 and into engagement with the clutch member 150. When the lever is engaged by the face 179 of the cam 175, the weight of the lever and of the solenoid plunger and stem prevents the clutch member 151 from being shifted back into engagement with the clutch member 149, and causes the lever to come to rest substantially in the position shown in Fig. 8, with the clutch member 151 in its neutral position.

Figure 5:
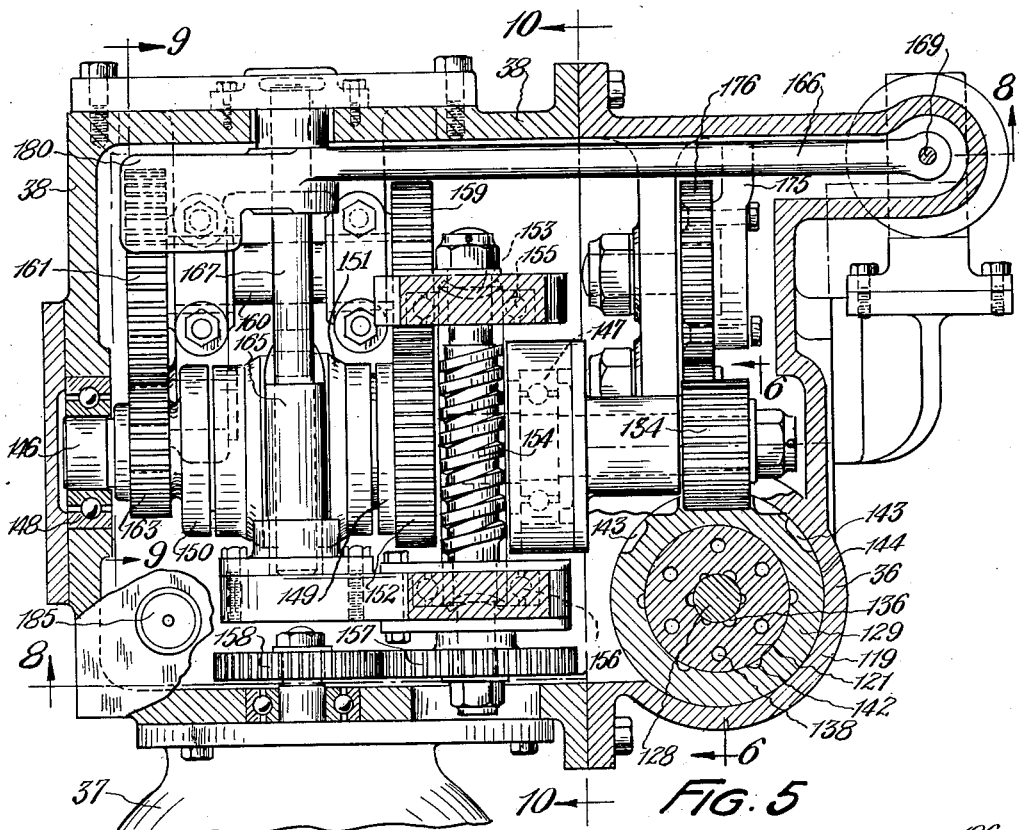
Fig. 5 is a sectional plan view taken on the line 5—5 of Fig. 2.

After a hardness test has been made and the solenoid 39 has been deenergized to cause the fluid pressure supply to be cut off, the spring 34 causes the piston 30 to be moved upwardly, thereby forcing fluid back to the pump through the pipe 35. Likewise, some of the fluid delivered to the control unit is returned to the pump through the pipe 59 by the action of the springs 100 and 65. However, during the operation of the control unit as previously explained, some of the fluid is admitted to the chamber 99 through the passage 117. To return this fluid to the pump, as well as any fluid which may have leaked into the chambers 64 and 105, I provide a return pipe 182 which communicates directly with the chamber 64 and with the chambers 99 and 105 through the passages 183 and 184. If desired, the pipe 182 may be arranged to communicate directly with the cylinder 144 of the pump, but I prefer to connect this pipe with the transmission casing 38 which, as shown in Fig. 5, communicates directly with the cylinder 144 of the outer pump casing 119.

The supply of fluid contained in the system may be replenished by removal of the filling plug 185 of the transmission casing 38 and the introduction of additional fluid at this point whenever this becomes necessary or desirable.

Figures 9, 13:
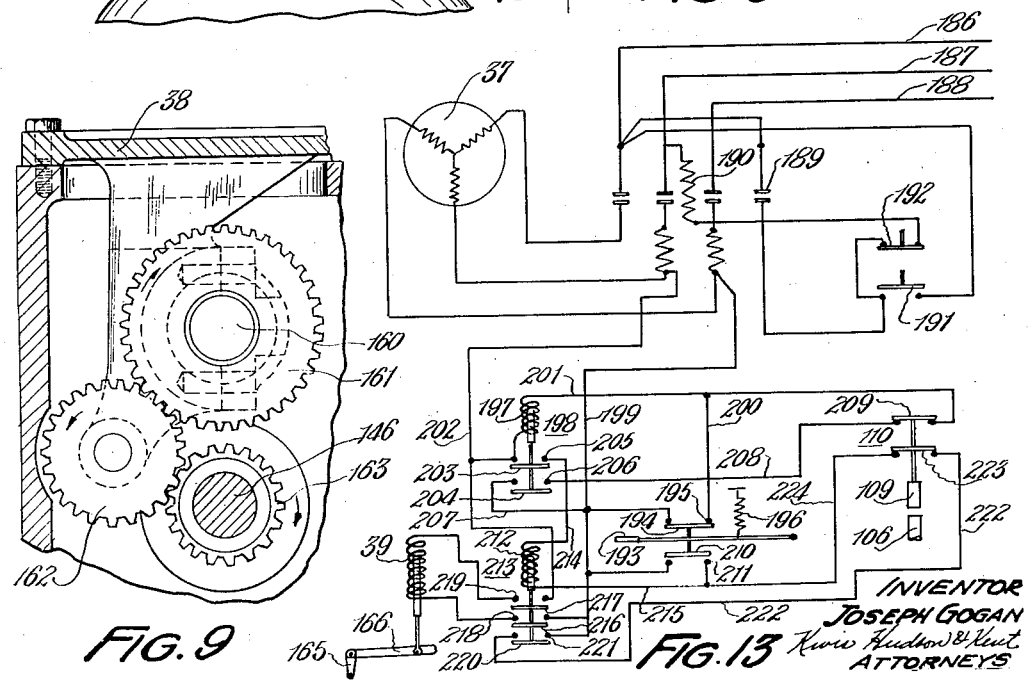
Fig. 9 is a partial elevational view of the pump actuating means taken on line 9—9 of Fig. 5.
Fig. 13 is a wiring diagram showing circuits for the pump operating motor and for manually controlling the operation of the testing apparatus.

To provide a simple form of automatic control for operating the machine, I employ the arrangement of circuits and switches illustrated diagrammatically in Fig. 13. In this diagram I have shown the synchronous motor 37 as being connected to the three phase power conductors 186, 187 and 188, through the contacts 189 of a magnetic switch 190. This switch is of conventional form, and is provided with start and stop buttons 191 and 192 for controlling the closing and opening of the contacts 189 when it is desired to start or stop the motor. During ordinary use of the testing machine, the motor 37 is started by pressing the button 191 and is allowed to run continuously during the work period devoted to the testing of pieces.

To enable the operator to energize the solenoid 39 when a piece is to be tested, I provide a control switch, preferably in the form of a foot switch 193, having a contact member 194 which is normally held in engagement with the contacts 195 by the spring 196. While the contact member 194 remains in engagement with the contacts 195, the winding 197 of an electromagnet 198 remains energized. The circuit for the winding 197 may be traced from the power conductor 199, through the contact member 194 and the conductors 200 and 201, to the winding 197 and thence to the power conductor 202. When the winding 197 is energized, the contact members 203 and 204 of the switch 198 are moved into engagement, respectively, with the contacts 205 and 206. The engagement of the contact member 204 with the contacts 206 closes a second circuit for energizing the winding 197, so that when the operator moves the contact member 194 out of engagement with the contacts 195, the winding 197 will remain energized. This second energizing circuit for the winding 197 may be traced from the power conductor 199, through the conductor 207, through the contact member 204 and the conductor 208 and through the contact member 209 of the normally closed solenoid switch 110, and then through conductor 201 to the winding 197 and thence to the power conductor 202.

When the foot switch 193 is depressed by the operator to make a test, the contact member 194 moves out of engagement with the contacts 195 and the contact member 210 is thereby moved into engagement with the contacts 211. The engagement of the contact member 210 with the contacts 211 causes the winding 212 of an electromagnetic switch 213 to be energized. The circuit for this winding may be traced from the power conductor 202, through the contact member 203, which has been previously closed by the energizing of the winding 197, through the conductor 214 to the winding 212, and thence through conductor 215 and contact member 210 back to the power conductor 199. The energizing of the winding 212 of the switch 213 causes the contact members 216 and 217 of this switch to be moved, respectively, into engagement with the contacts 218 and 219, to thereby close the circuit which includes the winding of the solenoid 39. The circuit for the winding of the solenoid 39 may be traced from the power conductor 202, through the contact member 217, to the solenoid winding and thence through contact member 216 to the power conductor 199. The energization of the winding of the solenoid 39 causes the clutch lever 165 to be lifted and the clutch member 151 thereby shifted into engagement with the clutch member 149 to move the pump cylinder upwardly in the manner already described.

To provide for deenergization of the solenoid 39 after a piece has been tested, and to prevent the solenoid from being reenergized should the operator neglect to take his foot off the switch 193, I employ an automatic control which requires proper manipulation of the foot switch 193 to obtain actuation of the ball 25 for the testing of successive pieces. This automatic control includes a contact member 220, which is moved into engagement with the contacts 221 by the energization of the winding of the switch 213. The engagement of the contact member 220 with the contacts 221 causes the winding 212 to remain energized so long as the winding 197 of the switch 198 remains energized and the switch 110 remains in the closed position. This auxiliary energizing circuit for the switch 213 may be traced from the power conductor 199, through contact member 220, conductor 222, contact member 223 of the normally closed switch 110, and through conductors 224 and 215 to the winding 212 and thence through conductor 214 and contact member 203 to the power conductor 202.

From the circuit arrangement just described it will be seen that as soon as the stem 106 of the control unit causes the switch 110 to be actuated and the contact members 209 and 223 thereby moved to the open position, the winding 197 and the winding 212 will be deenergized. The deenergization of the winding 212 allows the contact members 216 and 217 to drop open, thereby causing the winding of the solenoid 39 to be deenergized. The deenergization of the winding 197 likewise allows the contact members 203 and 204 to drop open, with the result that the circuits for the windings 197 and 212 are so altered that these windings cannot again be energized until the operator has allowed the contact member 194 to be moved into engagement with the contacts 195 by the spring 196. After the winding 197 has been energized by the release of the foot switch, the winding 212 may then be energized by depressing the foot switch to cause the contact member 210 to engage the contacts 211, whereupon the winding of the solenoid 39 is energized by the closing of the switch 213 to cause the desired operation of the machine.

It will be seen from the foregoing description, that during the operation of my hardness testing machine the reading or indication obtained from the gauge 40 represents the extent to which the test ball 25 is pressed into a test piece by a definite or predetermined pressure value. It is a well recognized law of physics that the hardness of a material is directly proportional to the depth to which a test ball is forced into the material by a definite pressure, and it will thus be seen that the readings obtained from the gauge 40 indicate directly the hardness of the pieces being tested.

As the individual pieces of unknown hardness are tested, the operator notes the position of the gauge pointer, relative to a reference character or line representing a certain hardness value, and if the pointer stops short of this reference character, the operator will know that the piece is harder than required, and if the pointer moves beyond the reference character he will know that the piece being tested is softer than it should be. Knowing the amount of permissible variation in the hardness of the pieces relative to a desired hardness for the character of material being tested, the operator is able to determine directly from the gauge indications which pieces are to be rejected as unsatisfactory. From time to time during the operation of the machine, it may be desirable to have the operator insert a standard test piece of known hardness, and make a test thereon for the purpose of checking the accuracy of the machine.

In Figs. 14 and 15 of the drawings, I have shown a hardness testing machine which operates on substantially the same principle as the machine just described, but wherein the electro-magnets for controlling the operation of the indicating gauge are arranged somewhat differently. As shown in Fig. 15, a movable magnet 230 is connected to the plunger 231 which actuates the test ball (not shown) by means of a stem or rod 232 which passes through the cover 234 of the fluid pressure cylinder 235. Leakage of fluid around the rod 232 may be prevented by use of a suitable packing gland 236. A magnet 237 is stationarily arranged above the highest point of travel of the magnet 230 by being mounted in a support or bracket 238 which may be mounted upon a convenient portion of the machine, such as the cylinder cover 234.

A gauge 239 of suitable construction, is mounted upon the bracket 238 above the stationary magnet 237. This gauge is provided with a movable pointer 240 and an outwardly extending movable stem 241, and also embodies a spring which normally tends to cause rotation of the pointer and downward movement of the stem 241. A magnetizable member 242 is pivotally connected to the stem 241 and extends downwardly past the core 243 of the magnet. This member bears against the lever 244, which extends through an opening provided in the bracket 238, and is pivoted to the bracket by means of the pin 245. The lever 244 is provided with a slidable counterweight 246, which is so adjusted that the force resulting from the normal tendency of the gauge spring to move the member 242 downwardly, is slightly exceeded, with the result that the gauge pointer is normally returned to the zero position by the action of the pivoted lever overcoming the gauge spring.

At or adjacent the end of the lever 244, against which the magnetizable member 242 bears, I provide a second magnetizable member 247 which is pivoted to the lever and extends downwardly between the movable magnet 230 and the bracket 238. When a hardness test is being made with this machine, motive fluid of a desired pressure value is admitted to the cylinder 235 through the pipe 248. Some of the motive fluid is also admitted to the cylinder of the control device 249 through the pipe 250. When the pressure of the fluid reaches a predetermined value it causes upward movement of a plunger contained in the control device 249 to thereby move the contact member 251 upwardly into engagement with a contact member 252. The closing of these contact members closes the circuit of the magnet 230, causing the winding of this magnet to be energized from the battery 253. The energization of the magnet 230 causes the magnetizable member 247 to be attracted and thereby connected for movement with the plunger 231. As this plunger is moved downwardly to press the ball into the test piece, the contact member 251 continues to move upwardly, carrying the contact member 252 with it and causing the latter to engage the contact member 254. The engagement of the contact member 252 with the contact member 254 closes the circuit of the stationary magnet 237, so that energizing current will be supplied thereto from the battery 253. The energization of the magnet 237 causes the magnetizable member 242 to be attracted and thereby held or locked against movement in either direction. The operator now observes the position of the pointer of the gauge, which enables him to compare the hardness of the piece being tested with the hardness of a standard test piece.

In carrying out a test in the manner just described motive fluid of predetermined pressure value may be supplied to the cylinder 235, and to the control unit 249, from any suitable source, such as the pump 255. At the completion of the test the pressure of the motive fluid is relieved, as by controlling the operation of the pump 255, thereby allowing the contacts 251 and 252 to be moved downwardly to their open position, as shown in Fig. 14. The opening of these contacts deenergizes the electro-magnets 230 and 237, thereby releasing the magnetizable members 242 and 247 and allowing the gauge pointer to return to its zero position. If desired, the fluid pressure supply means may include a reservoir 256 for maintaining the system charged with fluid, and a pressure regulator 257 for obtaining the desired predetermined pressure value. Likewise, a suitable pressure gauge 258 may be employed to enable the operator to determine from time to time whether or not the proper pressure is being applied to the ball actuating plunger 231.

It will be readily understood from the foregoing description, that I have provided a novel form of testing apparatus which is extremely accurate, and which is capable of testing individual pieces in rapid succession. It will also be noted that in the testing apparatus disclosed, the synchronous motor will operate at substantially uniform speed regardless of load, so that the ball will be pressed into the test piece at an absolutely uniform rate, and error due to characteristics of the metal being tested, will be entirely eliminated. Moreover, it will be seen that the electromagnetic control means which I have devised for controlling the actuation of the gauge, provides for extremely accurate functioning of the machine. It will also be noted that the fluid pressure supply means which I employ, provides efficient and compact means for causing an initial rapid movement of the impression member into engagement with the test piece, and a subsequent slow, but uniform, movement of the impression member into the metal of the piece being tested. It is also characteristic of my testing machine that I provide an efficient and reliable form of control which is largely automatic in operation, making possible the successful use of the machine in factories employing unskilled labor.

While I have illustrated and described the testing apparatus of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. In testing apparatus of the character described the combination of a support for a test piece, a contact member adapted to be applied to said test piece, means for causing relative movement between said contact member and said support to thereby distort said test piece, an indicator, means for rendering said indicator responsive to said relative movement, and means for rendering the indicator non-responsive to the relative distorting movement when the force applied to the test piece reaches a predetermined value.

2. In testing apparatus of the character described the combination of a support for a test piece, a movable contact member adapted to be applied to the test piece, means for applying a force to said contact member to thereby distort said test piece, an indicator, means for rendering said indicator responsive to movement of said contact member, and means for rendering said indicator non-responsive to movement of said contact member when the force applied to said contact member reaches a predetermined value.

3. In testing apparatus of the character described the combination of a contact member adapted to be applied to a test piece, means for applying a force to said contact member to thereby distort said test piece, an indicator, means responsive to said force for rendering said indicator responsive to movement of said contact member, and means for rendering the indicator non-responsive to movement of the contact member when the force applied to said contact member reaches a predetermined value.

4. In testing apparatus of the character described the combination of a contact member adapted to be applied to a test piece, means for applying a force to said contact member to thereby distort said test piece, indicating means, means responsive to said force for rendering said indicating means effective to register movement of said contact member, and means responsive to a predetermined value of said force for rendering the indicating means non-responsive to the movement of the contact member and for locking said indicating means in the position thereof corresponding with said predetermined value.

5. In testing apparatus of the character described the combination of a contact member adapted to engage a test piece, means for applying force to said contact member to thereby distort said test piece, an indicator for measuring distortion of said test piece, means for actuating said indicator, and means responsive to the force exerted by said force applying means for operatively connecting said actuating means with and disconnecting the same from said contact member.

6. In testing apparatus of the character described the combination of a contact member adapted to engage a test piece, a movable holder for said contact member, means for moving said holder to thereby distort said test piece, an indicator, movable means for actuating said indicator, means for connecting the indicator actuating means for movement with said holder, and means responsive to the force exerted by the holder moving means for disconnecting the indicator actuating means from said holder.

7. In testing apparatus the combination of an impression member, means for actuating said impression member to press the same into a test piece, indicating means, means for operatively connecting said indicating means with said actuating means whereby the former is adapted to be actuated upon movement of said impression member into said piece, and means for disconnecting said indicating means from said actuating means when a predetermined force is exerted by the latter on said impression member.

8. In testing apparatus of the character described the combination of a frame, an impression member, a holder movable in said frame for pressing said impression member against a test piece, an indicator supported on said frame, a movable control member for controlling the actuation of said indicator, means for releasably locking said control for movement with said holder to thereby cause actuation of said indicator, and means responsive to a predetermined force exerted on said impression member by said holder for releasing said control from said holder.

9. In testing apparatus the combination of an impression member, means for actuating said impression member to press the same into a test piece, an indicator, a member effectively connected to said indicator and adapted for engagement with said actuating means and to be moved thereby to operate said indicator, means for releasably connecting the indicator operating member with said actuating means, and means responsive to a predetermined force exerted on said impression member by said actuating means to automatically move the indicator operating member out of engagement with said actuating means.

10. In testing apparatus the combination of an impression member, means for actuating said impression member to press the same into a test piece, an indicator, means effectively connected to said indicator and adapted for movement by said actuating means for operating said indicator, means for releasably connecting the indicator operating means with said actuating means, and electromagnetic means adapted to arrest movement of the indicator operating means, when the pressure applied to said impression member by said actuating means reaches a predetermined value.

11. In testing apparatus of the character described the combination of an impression member, means for actuating said impression member to press the same into a test piece, an indicator, a magnetizable member having operative connection with said indicator, means for releasably connecting said magnetizable member for movement with said actuating means, a magnet arranged to attract said magnetizable member to disconnect the latter from said actuating means, and means for energizing said magnet when the pressure applied to said impression member reaches a predetermined value.

12. In testing apparatus of the character described the combination of a contact member adapted to be applied to a test piece, a plunger arranged to move said contact member to thereby distort said test piece, means for applying an actuating force to said plunger, an indicator having an actuating member, an electromagnet movable with said plunger and adapted when energized to render said indicator actuating member responsive to movement of said contact member, and a switch responsive to said actuating force for controlling the energization of said electromagnet.

13. In testing apparatus of the character described the combination of a frame, an impression member, a holder movable in said frame for pressing said impression member against a test piece, an indicator supported on said frame, a movable control for said indicator, said control being of magnetic material, a magnet movable with said holder and adapted to attract said control to thereby connect the latter for movement with said holder, a stationary electromagnet adapted to attract said control to arrest movement thereof, and means for energizing said electromagnet when the pressure applied to said impression member reaches a predetermined value.

14. In testing apparatus of the character described the combination of an impression member, means for actuating said impression member to press the same into a test piece, an indicator, a magnetizable member having operative connection with said indicator, a magnet movable with said actuating means and arranged to attract said magnetizable member to thereby connect the latter for movement with said actuating means, a stationary magnet adapted to attract said magnetizable member to thereby disconnect the same from said actuating means, and means for energizing said stationary magnet when the pressure applied to said impression member reaches a predetermined value.

15. In testing apparatus of the character described the combination of a contact member adapted to be applied to a test piece, a holder arranged to move said contact member to thereby distort said test piece, means for applying an actuating force to said holder, an indicator having an actuating member, an electromagnet arranged for movement by said holder and adapted when energized to render said indicator actuating member responsive to movement of said contact member, a stationary electromagnet adapted when energized to render the movable electromagnet ineffective, and switch means responsive to said actuating force for energizing said electromagnets in succession.

16. In testing apparatus of the character described the combination of a contact member adapted to be applied to a test piece, a cylinder, a plunger in said cylinder for moving said contact member to thereby distort said test piece, a pump for supplying pressure fluid to said cylinder to actuate said plunger, an indicator having an actuating member, an electromagnet arranged for movement by said plunger and adapted when energized to render said indicator actuating member responsive to movement of said contact member, a stationary electromagnet adapted when energized to render the movable electromagnet ineffective, and switch means responsive to said pressure fluid for energizing said electromagnets in succession.

17. In testing apparatus of the character described the combination of a contact member adapted to be applied to a test piece, a cylinder, a plunger in said cylinder for moving said contact member to thereby distort said test piece, a pump for supplying pressure fluid to said cylinder to actuate said plunger, means for driving said pump including a clutch and an electromagnet for actuating said clutch, an indicator having an actuating member, another electromagnet arranged for movement by said plunger and adapted when energized to render said indicator actuating member responsive to movement of said contact member, a stationary electromagnet adapted when energized to render the movable electromagnet ineffective, and switch means adapted to be actuated in succession by said pressure fluid for controlling the energization of said electromagnets.

18. In testing apparatus of the character described the combination of a contact member adapted to be applied to a test piece, a cylinder, a plunger in said cylinder for moving said contact member to thereby distort said test piece, a pump for supplying pressure fluid to said cylinder to actuate said plunger, means for driving said pump including a clutch and an electromagnet for actuating said clutch, a circuit for said electromagnet including a normally closed switch, an indicator, means responsive to said pressure fluid for rendering said indicator responsive to movement of said contact member, means responsive to a predetermined pressure value of said fluid for rendering the last mentioned means ineffective, and means adapted to be actuated by said pressure fluid for opening said normally closed switch.

19. In testing apparatus of the character described the combination of a contact member adapted to be applied to a test piece, a cylinder, a plunger in said cylinder for moving said contact member to thereby distort said test piece, a pump for supplying pressure fluid to said cylinder to actuate said plunger, means for driving said pump including a motor and a clutch for connecting said pump to said motor, an electromagnetic control for said clutch, a circuit for said electromagnetic control including a normally closed switch, an indicator, means responsive to said pressure fluid for rendering said indicator responsive to movement of said contact member, means responsive to a predetermined pressure value of said fluid for rendering the last mentioned means ineffective, means adapted to be actuated by said pressure fluid for opening said normally closed switch, and means for delaying the actuation of the last mentioned means.

20. In testing apparatus of the character described, the combination of a contact member adapted to engage a test piece, means for applying a force to said contact member to thereby distort said test piece, an indicator for registering distortion of said test piece, electromagnetic means for operatively connecting said indicator with and disconnecting the same from said contact member, means responsive to said force for controlling said electromagnetic means, control means for rendering said force applying means ineffective, and means for preventing actuation of the last mentioned control means until the control means for said electromagnetic means has responded to said force.

21. In testing apparatus of the character described, the combination of a contact member adapted to engage a test piece, means for moving said contact member to thereby distort said test piece including a piston and a cylinder for said piston, means for supplying pressure fluid to said cylinder, means for registering distortion of said test piece, electromagnetic means for connecting said registering means with and disconnecting the same from said contact member, a plunger adapted to be moved by said pressure fluid for controlling said electromagnetic means, means for controlling said fluid pressure supply means, a plunger for actuating the last mentioned control means, and means associated with the first mentioned plunger for controlling the supply of pressure fluid to the second mentioned plunger.

22. In testing apparatus of the character described the combination of a contact member adapted to be applied to a test piece, means for applying a force to said contact member to thereby distort said test piece including a piston and a cylinder for said piston, means for supplying pressure fluid to said cylinder, means for controlling the supply of pressure fluid to said cylinder including an electromagnet, a manually operable switch in the circuit of said electromagnet and having a switch member adapted for movement from a released position to an operative position for energizing said electromagnet, and means cooperating with said switch member to prevent energization of said electromagnet until said switch member has first been moved to said released position.

23. In testing apparatus of the character described the combination of a contact member adapted to be applied to a test piece, a movable holder for actuating said contact member to thereby distort said test piece, an indicator having an actuating member, and an electromagnet movable with said holder and adapted when energized to render said indicator actuating member responsive to movement of said contact member.

24. In testing apparatus of the character described the combination of a frame, an impression member, a holder movable in said frame for pressing said impression member against a test piece, an indicator supported on said frame, a movable control for said indicator, said control being of magnetic material, and a magnet movable with said holder and adapted to attract said control to thereby connect the latter for actuation by said holder.

25. In testing apparatus of the character described the combination of a contact member for engagement with a test piece, means for applying a force to said contact member to thereby distort said test piece including a piston and a cylinder for said piston, means for indicating the extent of a portion of the movement of said contact member during the distortion of said test piece comprising an indicator and an actuating member therefor, means for connecting said actuating member with said contact member for movement therewith after said contact member has moved through a portion of its stroke, and means for supplying pressure fluid to said cylinder at a substantially constant rate during the distortion of the test piece.

26. In testing apparatus of the character described the combination of a contact member for engagement with a test piece, means for actuating said contact member including a piston and a cylinder for said piston, means for supplying pressure fluid to said cylinder for causing an initial rapid movement of said contact member relative to said test piece, means for subsequently supplying pressure fluid to said cylinder at a rate to cause relatively slow but substantially uniform movement of said contact member for distorting said test piece, means for indicating the extent of a portion of the movement of said contact member during the distortion of the test piece comprising an indicator and an actuating member therefor, and means for connecting said actuating member with said contact member for movement therewith after said initial rapid movement.

27. In testing apparatus of the character described the combination of a contact member for engagement with a test piece, means for applying a force to said contact member to thereby distort said test piece including a piston and a cylinder for said piston, means for indicating the extent of a portion of the movement of said contact member during the distortion of said test piece comprising an indicator and an actuating member therefor, means for connecting said actuating member with said contact member for movement therewith after said contact member has moved through a portion of its stroke, means for supplying pressure fluid to said cylinder at a substantially constant rate during the distortion of the test piece, and means for rendering the pressure fluid supply means ineffective when the pressure of the fluid reaches a predetermined value.

28. In testing apparatus of the character described the combination of a contact member for engagement with a test piece, means for applying a force to said contact member to thereby distort said test piece including a piston and a cylinder for said piston, means for indicating the extent of a portion of the movement of said contact member during the distortion of said test piece comprising an indicator and an actuating member therefor, means for connecting said actuating member with said contact member for movement therewith after said contact member has moved through a portion of its stroke, a reciprocating pump for supplying motive fluid to said cylinder at a substantially constant rate but under progressively increasing pressure during the distortion of the test piece, and means rendered effective for reversing the pump when the pressure of the fluid reaches a predetermined value.

29. In testing apparatus of the character described the combination of a contact member for engagement with a test piece, means for actuating said contact member including a piston and a cylinder for said piston, means for supplying a pressure fluid to said cylinder for causing an initial rapid movement of said contact member relative to said test piece, means for subsequently supplying pressure fluid to said cylinder at a rate to cause relatively slow but substantially uniform movement of said contact member for distorting said test piece, means for indicating the extent of a portion of the movement of said contact member during the distortion of said test piece comprising an indicator and an actuating member therefor, means for connecting said actuating member with said contact member for movement therewith after said initial rapid movement, and means for interrupting the supply of pressure fluid to said cylinder when the pressure of the fluid reaches a predetermined value.

30. In testing apparatus of the character described the combination of a contact member adapted to be applied to a test piece, a movable holder for actuating said contact member to thereby distort said test piece, fluid pressure means for actuating said holder, an indicator having an actuating member, said holder being movable through a portion of its stroke independently of said actuating member, and means for connecting said actuating member with said holder for movement therewith after said contact member has moved through said portion of its stroke, the last mentioned means being rendered effective in response to the fluid pressure.

31. In testing apparatus of the character described the combination of a contact member adapted to be moved into engagement with and to distort a test piece, a movable holder for actuating said contact member, fluid pressure means for actuating said holder, an indicator having an actuating member, said holder being initially movable independently of said actuating member, and means whereby said actuating member is caused to be responsive to the movements of said contact member after the latter has moved into engagement with said test piece, the last mentioned means being rendered effective in response to the occurrence of a predetermined pressure value of the fluid.

32. In testing apparatus the combination of a test piece support, a contact member, a movable holder for said contact member, fluid pressure means for actuating said holder to cause said contact member to engage and distort a test piece, an indicator having an actuating member extending adjacent said holder and adapted to be connected therewith, and means carried by said holder and automatically rendered effective for connecting the indicator actuating member with the holder substantially upon engagement with the test piece, the last mentioned means being responsive to the increase in the pressure of the fluid incident to said engagement.

33. In testing apparatus of the character described the combination of a contact member adapted to be moved into engagement with and to distort a test piece, a movable holder for actuating said contact member, an indicator having an actuating member adapted to be effectively connected by magnetic attraction for movement proportionately with said contact member, and an electromagnet adapted when energized to cause such magnetic attraction.

34. In testing apparatus of the character described the combination of a contact member adapted to be moved into engagement with and to distort a test piece, a movable holder for actuating said contact member, an indicator having an actuating member adapted to be effectively connected with said holder by magnetic attraction, an electromagnet for producing such attraction, and means rendered effective upon engagement of said contact member with said test piece for energizing said electromagnet.

35. In testing apparatus of the character described the combination of a contact member adapted to be moved into engagement with and to distort a test piece, a holder movable in response to fluid pressure for actuating said contact member, an indicator having an actuating member adapted to be effectively connected by magnetic attraction for movement proportionately with said contact member, an electromagnet adapted when energized to cause such magnetic attraction, and means for energizing the electromagnet including a control actuated by the fluid pressure.

36. In testing apparatus of the character described the combination of a contact member adapted to be moved into engagement with and to distort a test piece, a holder movable in response to fluid pressure for actuating said contact member, an indicator having an actuating member adapted to be effectively connected by magnetic attraction for movement proportionately with said contact member, an electromagnet adapted when energized to cause such magnetic attraction, and magnet energizing means including a switch adapted to be actuated by an increase in the pressure of the fluid incident to engagement of the contact member with the test piece.

37. In testing apparatus of the character described the combination of a test piece support, a test member movable relative to said support for engagement with a test piece, means for applying force to said movable test member to distort said test piece, an indicator having a movable actuating member adapted to be releasably connected for movement with said test member, means for establishing an operative connection between the indicator actuating member and said test member, and means rendering the last means ineffective during a portion of the stroke of the test member.

38. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a source of pressure fluid, conduit means connecting said cylinder with said source, means for preventing the pressure of the fluid being supplied to said cylinder from exceeding a predetermined maximum value, an indicator having an actuating member adapted to be releasably connected for movement with said movable means, and means, including a control responsive to a preliminary pressure value of the fluid, for establishing an operative connection between the indicator actuating member and said movable means.

39. In testing apparatus the combination of a supporting means, means movable relative to said supporting means, a contact member associated with one of said means for engagement with a test piece, means for actuating said movable means to cause said contact member to distort the test piece including a piston and a cylinder for said piston, a source of pressure fluid, conduit means connecting said cylinder with said source, means for preventing the pressure of the fluid being supplied to said cylinder from exceeding a predetermined maximum value, an indicator having an actuating member adapted to be releasably connected with said movable means by magnetic attraction, an electromagnet for causing such magnetic attraction, and means, including a magnet-energizing control responsive to a preliminary pressure value of the fluid, for establishing an operative connection between the indicator actuating member and said movable means.

40. In testing apparatus the combination of a supporting means, means movable relative to said supporting means, a contact member associated with one of said means for engagement with a test piece, means for actuating said movable means to cause said contact member to distort the test piece including a piston and a cylinder for said piston, means for supplying pressure fluid to said cylinder, an indicator having an actuating member, and means for rendering said indicator actuating member responsive to movement of said movable means during a portion of the stroke of the latter, such rendering means comprising means adapted to be actuated in response to the pressure of said fluid for releasably locking the indicator actuating member with said movable means.

41. In testing apparatus the combination of a penetrator adapted to engage and distort a test piece, a support for the test piece, a movable holder for said penetrator, actuating means for said holder including a piston operatively connected with the holder and a cylinder for the piston, means for supplying pressure fluid to said cylinder, an indicator having an actuating member, and means for rendering said indicator actuating member responsive to movement of said penetrator during a portion of the stroke of the latter, the last mentioned means comprising locking means carried by said holder and adapted to be actuated in response to a predetermined pressure value of said fluid for releasably locking the indicator actuating member with said holder.

42. In testing apparatus the combination of a supporting means, means movable relative to said supporting means, a contact member associated with one of said means for engagement with a test piece, means for actuating said movable means to produce relative movement between the supporting means and movable means in a direction to cause said contact member to distort the test piece, including a piston and a cylinder for said piston, means for supplying pressure fluid to said cylinder, an indicator having an actuating member, said movable means having abutment means thereon adjacent which the indicator actuating member extends, means carried by said movable means for pressing said actuating member against said abutment means to thereby releasably connect the indicator actuating member with said movable means, and means responsive to the pressure of said fluid for controlling the pressing means.

43. In testing apparatus the combination of a supporting means, means movable relative to said supporting means, a penetrator associated with one of said means for engagement with a test piece, means for actuating said movable means to cause said penetrator to distort the test piece, said movable means having abutment means thereon, an indicator having an actuating member extending adjacent said abutment means, means for releasably connecting said indicator actuating member with said movable means including means carried by said movable means and arranged for pressing said actuating member against said abutment means, and means for rendering said pressing means ineffective during a portion of the movement of said movable means.

JOSEPH GOGAN.